United States Patent Office 3,468,839
Patented Sept. 23, 1969

3,468,839
POLYMER COMPOSITIONS CONTAINING BASIC MAGNESIUM CARBONATE
James J. Millane, Solihull, England, assignor to Bakelite Xylonite Limited, a British corporation
No Drawing. Filed Nov. 30, 1967, Ser. No. 686,824
Int. Cl. C08g *51/04, 51/24, 51/56*
U.S. Cl. 260—38                                   8 Claims

ABSTRACT OF THE DISCLOSURE

A composition comprising an organic polymeric material and at least 5 percent by weight of the organic polymeric material of basic magnesium carbonate.

BACKGROUND

This invention relates to compositions of organic polymeric materials and in particular to compositions of organic polymeric materials and additives, the compositions being generally useful for molding and casting applications and in particular for insulation for electrical apparatus.

SUMMARY

According to the present invention there is provided a composition comprising an organic polymeric material, and at least 5 percent by weight of the organic polymeric material of basic magnesium carbonate. Optionally, fillers can be included in the composition.

DESCRIPTION

Illustrative of the organic polymeric materials that can be used in the compositions of the invention are polyester resins, melamine/phenol/formaldehyde resins (mixtures or co-condensates), melamine/formaldehyde resins, urea/formaldehyde resins, phenol/formaldehyde resins, and polyepoxides having either internal or terminal epoxide groups.

The organic polymeric materials can be thermosetting or thermoplastic and can include synthetic rubbers. Hardeners can be included in the compositions where necessary.

Preferred polymeric materials are polyester dough molding compounds (for instance based on 70 percent solution of propylene maleate phthalate in styrene), melamine/phenol/formaldehyde prepared by the alkaline catalysis of approximately equimolar quantities of the three constituents, and polyglycidyl ethers of bisphenol A.

I have found that the use of basic magnesium carbonate in organic polymeric material can improve the fire retardant and anti-tracking properties of the compositions.

While I do not wish the invention to be limited by some particular hypothesis about the mechanism of the action of basic magnesium carbonate, I believe that its effectiveness in improving the fire-retardant properties of organic polymeric materials is due to its property of decomposing endothermically at temperatures not higher than those encountered when organic polymeric compositions burn. Temperatures of 600° C.–800° C. are not uncommon during burning of such compositions and basic magnesium carbonate decomposes at temperatures below 600° C.

The action of basic magnesium carbonate in improving the anti-tracking properties of organic polymeric material is also likely to be a consequence of its endothermic decomposition below 600° C.

Basic magnesium carbonate is obtainable in a variety of forms, e.g. $3MgCO_3$, $Mg(OH)_2 \cdot 3H_2O \cdot$ and $3MgCO_3$, $Mg(OH)_2 \cdot 4H_2O$. It can be used in various amounts but its effectiveness increases with the amount included. It is generally convenient to include amounts of up to 40 percent by weight of the composition.

The fillers which can be included in the composition are those conventionally used, such as silica, clay, alumina, asbestos, glass fiber, or rag.

The compositions of the invention can be molded or cast, and can be used in the manufacture of articles such as high pressure laminates and electrical insulations. The compositions can be hot or cold molded.

The compositions of the invention are particularly suitable for the preparation of insulation for electrical equipment. Certain types of electrical equipment frequently experience electrical discharges between points of different potentials. Such discharges may be caused by high voltages or by contamination between these points. While insulation of electrical equipment desirably includes solid organic materials, which are inexpensive and readily molded or otherwise fabricated, it has been a particularly serious disadvantage that the organic constituents of such materials tend to form carbonaceous deposits upon exposure to electrical discharges, these deposits ultimately providing paths of sufficiently low resistance to occasion breakdown of the equipment. This effect is commonly known as tracking.

I have found that the inclusion of basic magnesium carbonate in the composition from which the insulations are made gives them good self-extinguishing and anti-tracking properties. When the carbonate is included in polyester dough molding compositions, self-extinguishing properties are conferred on the molded compositions without there being caused any deterioration of the anti-tracking properties of the composition. When the carbonate is included in melamine/phenol/formaldehyde or polyglycidyl ether bisphenol A compositions, the anti-tracking properties of the molded compositions are improved.

Thus, the invention also includes articles prepared from the composition in accordance with the invention, and particularly insulation for electrical apparatus; and electrical apparatus comprising such insulation.

The following examples are illustrative of the invention. Parts are parts by weight.

Example 1

This is a comparative example showing the anti-tracking properties of a molded insulation made from a composition of the invention (a) containing an epoxide resin, as compared with those of a molded composition not containing basic magnesium carbonate.

In each case the epoxide resin used was a commercial liquid resin consisting mainly of the diglycidyl ether of bisphenol A. The resin was mixed with a plasticizer (dibutyl phthalate), monocyanoethyldiethylenetriamine as a hardener, and the appropriate fillers. The compositions were:

(a)
|                          | Parts |
|--------------------------|------:|
| Epoxide resin            | 85    |
| Plasticizer              | 15    |
| Hardener                 | 17    |
| Basic magnesium carbonate| 20    |
| Silica flour             | 100   |

(b)
|              | Parts |
|--------------|------:|
| Epoxide resin| 85    |
| Plasticizer  | 15    |
| Hardener     | 17    |
| Silica flour | 120   |

The mixtures were degassed under vacuum to remove air bubbles and then cast into flat plates (⅛ in. thick) which were cured for 16 hours at 20–22° C. and subsequently heated for 2 hours at 100° C. The comparative Tracking Index of the samples was measured in accordance with I.E. Specification Publication No. 112. The results were as follows:

|  | C.T.I. |
|---|---|
| Mix (a) | >750 |
| Mix (b) | 250 |

Example 2

This example illustrates the self-extinguishing properties of a molded composition prepared in accordance with the invention from a styrenated propylene maleate phthalate polyester resin (a) as compared to a molded composition utilizing the same resin base but not containing basic magnesium carbonate.

The following raw materials were mixed in a sigma-bladed mixer until a homogenous mixture was obtained.

(a)

|  | Parts |
|---|---|
| Styrenated polyester resin | 24.9 |
| Benzoyl peroxide | 0.25 |
| Glass fiber | 9.4 |
| Clay and other fillers | 28.3 |
| Basic magnesium carbonate | 37.4 |

(b)

|  |  |
|---|---|
| Styrenated polyester resin | 24.9 |
| Benzoyl peroxide | 0.25 |
| Glass fiber | 9.4 |
| Clay and other fillers | 65.7 |

The products were molded at 150° C. for 2 minutes under 1½ tons/in.$^2$ as discs (4½ in. diameter and ⅛ in. thick) from which strips (4 in. x ½ in.) were cut and tested for flammability by the method of British Standard 2782:1958 Method 508A.

The following results were obtained:

|  | Self-extinguishing time (secs.) |
|---|---|
| Mix (a) | 3 |
| Mix (b) | Burned continuously until consumed. |

The use of basic magnesium carbonate as an additive in polyester compositions has the advantage over the use of chlorinated compounds that it does not impair the track resistant properties of the molded compositions.

Example 3

This example illustrates the anti-tracking properties of an insulation molded from a composition (a), in accordance with the invention, comprising a melamine/phenol/formaldehyde resin. A comparison is made with the properties of composition (b) which does not contain basic magnesium carbonate.

The formulations used were as follows:

Mix (a)

|  | Parts |
|---|---|
| Resin | 496 |
| Basic magnesium carbonate | 372 |
| Rag | 120 |

Mix (b)

|  |  |
|---|---|
| Resin | 496 |
| Clay | 372 |
| Rag | 120 |

The raw materials were mixed and compounded on hot rolls until the desired plasticity was obtained. The sheeted product was cooled, ground to a suitable fineness and molded at 150° C. under 1½ tons/in.$^2$ pressure for 2 minutes in a disc mold 4½ in. diameter x ⅛ in. thick. The Comparative Tracking Indexes of the molding were determined in accordance with I.E.C. Specification Publication 112.

The results of the I.E.C. tracking test on the molded discs were as follows:

|  | C.T.I. |
|---|---|
| Mix (a) | >750 |
| Mix (b) | 350 |

In a modification of the invention, the basic magnesium carbonate may be replaced by other substances capable of endothermic decomposition at temperatures below 600° C. Such substances may also be effective in improving the flame-retardant and tracking properties of compositions comprising organic polymeric materials. Magnesium sulphite, magnesium oxalate, and aluminum oxalate are examples of such substances.

What is claimed is:

1. A composition comprising an organic polymeric material selected from the group consisting of polyester resins, melamine/phenol/formaldehyde resins, melamine/formaldehyde resins, urea/formaldehyde resins, phenol/formaldehyde resins and polyepoxide resins, and 5 to 40 percent by weight, based on the weight of said composition, of basic magnesium carbonate.

2. The composition of claim 1 wherein the polymeric material is a polyester resin.

3. The composition of claim 1 wherein the polymeric material is a melamine/phenol/formaldehyde resin.

4. The composition of claim 1 wherein the polymeric material is a polyglycidyl ether of bisphenol A.

5. A composition comprising an organic polymeric material selected from the group consisting of polyester resins, melamine/phenol/formaldehyde resins, melamine/formaldehyde resins, urea/formaldehyde resins, phenol/formaldehyde resins and polyepoxide resins, 5 to 40 percent by weight, based on the weight of said composition, of basic magnesium carbonate, and a filler.

6. The composition of claim 5 wherein said filler is silica.

7. The composition of claim 5 wherein said filler is clay.

8. The composition of claim 5 wherein said filler is alumina.

References Cited

UNITED STATES PATENTS

| 2,597,987 | 5/1952 | Harding | 260—45.75 |
| 3,116,522 | 1/1964 | Taylor | 260—38 X |

OTHER REFERENCES

Kawaoka: Chemical Abstracts, vol. 51, col. 10111b, 1957.

Chemical Dictionary, Reinhold Publishing Corp., 1966, page 574.

MORRIS LIEBMAN, Primary Examiner

L. T. JACOBS, Assistant Examiner

U.S. Cl. X.R.

260—37, 39, 40, 45.7